Patented Mar. 8, 1938

2,110,545

UNITED STATES PATENT OFFICE 2,110,545

TREATMENT OF CELLULOSIC MATERIALS

Henry Dreyfus, London, England

No Drawing. Application April 19, 1935, Serial No. 17,264. In Great Britain May 16, 1934

5 Claims. (Cl. 92—9)

This invention relates to improvements in the treatment of cellulosic materials, and is more particularly concerned with the production from wood, wood pulps, straw and similar lignin-containing cellulosic materials of cellulose which may be employed in the manufacture of cellulose esters or ethers or other cellulose derivatives.

It is known that nitric acid has the property of opening up wood and similar ligno-cellulosic materials so that the encrusting matter may be readily removed, for example by an after-treatment of the wood substance with alkali. Generally, however, the effect of this treatment is deleterious to the quality of the cellulose, and makes it unsuitable for the manufacture of cellulose esters and ethers of good quality, especially when such cellulose esters and ethers are to be used for the production of artificial silk filaments and the like. The use of nitric acid in the further purification of chemical wood pulps also suffers from these disadvantages.

I have now found that this undesired attack on the cellulose may be largely or completely eliminated, and a product obtained which is eminently suitable for conversion into organic derivatives of cellulose to be used in the manufacture of artificial silk and other commercial products, by a nitric acid treatment under carefully regulated conditions, in particular under carefully regulated conditions of temperature and acid concentration.

According to the invention lignin-containing cellulosic materials, and especially ligno-cellulosic materials such as wood, are treated first with nitric acid of concentration between about 2 and 10% at a temperature below the normal boiling point of the acid, and then with an alkaline solution.

Advantageously the higher acid concentrations are used at relatively low temperatures, and the lower acid concentrations at relatively high temperatures. For example, an acid of concentration between 2 and 7%, and especially between 4 and 7%, may be employed at a temperature between 85° and 95° C.; thus a 5 or 6% acid may be employed at a temperature between 90° and 95° C. Similarly an acid of concentration between 7 or 8 and 10% may be employed at somewhat lower temperatures, for example at a temperature between 70° and 85° C. or even at still lower temperatures; thus a 10% acid may be used at temperatures down to about 50° C., e. g. at 60° or 65° C.

The precise combination of acid concentration and temperature that will produce the best results will depend partly on the nature of the material being treated, as well as on the time of treatment and the quantity of acid employed in relation to the wood or other cellulosic material.

In general the acid, calculated as anhydrous acid, may be used in amount between about 40 and 60%, and especially about 50%, on the wood or other cellulosic material. Thus, for example, 10 parts by weight of a 5% acid may be used for each part of wood or other cellulosic material, while when more concentrated acids are used, e. g. 8, 9 or 10% acids, the proportions may be lower, down to about 5 parts of dilute acid to each part of wood. Other proportions of acid may, however, be employed, say up to 100% of acid, calculated as anhydrous acid, e. g. 15 or 20 parts of 5% acid for each part of wood.

The period of treatment may be between about 1 and 10 hours; more especially between 2 and 6 or 8 hours, depending on the other conditions and on the material being treated.

After the nitric acid treatment the cellulosic material may be freed from the acid as far as possible by pressing, centrifuging or the like and may, if desired, be washed. Thereafter it may be treated with alkali so as to remove the products of the nitric acid treatment and to purify the cellulose. It may, for example, be treated with cold, moderately strong alkali, for example a caustic soda of 15-20% strength, and/or it may be treated with moderately hot or hot or boiling solutions of alkali of lower concentrations, and especially concentrations of under 5%, for example 1½–3½%. The treatment with such dilute alkali may be relatively vigorous, for example it may be carried out at the boiling point of the alkali solution at atmospheric pressure or may be carried out under pressure either at the boil or below the boil, for example at temperatures of 100–130° C. It is particularly advantageous to employ such dilute alkali under a pressure in excess of the vapour pressure of the solution at the temperature obtaining; such excess pressure may, for example, be produced by compressed nitrogen or other gas having no deleterious effect on the treatment. Thus, for example, pressures of 6–10 atmospheres in excess of the vapour pressure of the alkali solution may be employed at temperatures of 100–130° C.

The cellulosic material treated as described above with nitric acid may with advantage be subjected to a two-fold treatment with alkali, preferably first with dilute alkali at elevated or moderately elevated temperatures and under atmospheric pressure or superatmospheric pressures, and then with cold dilute alkali, for example caustic alkali of 15–20% strength.

Any one or more of the above treatments may be carried out in stages, for example the nitric acid treatment may be repeated before a treatment with dilute or strong alkali and/or a treatment with dilute alkali may be repeated one or more times.

The nitric acid may be produced in the presence of the wood or other cellulosic material. For example, wood may be impregnated with a solution of a soluble nitrate and, with or without intermediate centrifuging but preferably without drying, treated with sulphuric acid or other mineral acid to liberate the nitric acid. The concentrations and quantities of nitrate and sulphuric acid or like mineral acid are adjusted to give the desired concentration of nitric acid.

The treatments described above are particularly suitable for treatment of woods of various kinds. The more resistant woods such as spruce wood may, if desired, be subjected to somewhat more vigorous conditions than those specified, but in any case for the production of a good quality cellulose the limits of the conditions of the nitric acid treatment should be observed. Chemical wood pulps containing relatively small proportions of lignin may be subjected to less vigorous conditions during the various treatments, but it is better to observe the conditions specified above and to shorten the time of treatment. Mechanical wood pulps may be treated in exactly the same manner as wood itself.

The cellulose prepared by the present processes may be utilized for any desired purpose, for example for the manufacture of cellulose derivatives or for the manufacture of paper or other products comprising fibrous cellulose. For these purposes it may be subjected to any desired treatments such as a chlorine or hypochlorite bleach or any other bleaching treatment.

For the manufacture of organic esters of cellulose with the aid of organic acid anhydrides the cellulose is preferably first subjected to a treatment with an acid, and particularly a lower fatty acid, for example formic acid or acetic acid. Such acids may be applied in small or large quantities and in liquid or vapour form. Similarly, treatments with mineral acids, for example hydrochloric acid, sulphuric acid or even nitric acid, may be applied, preferably in conjunction with acetic acid or other lower fatty acid. Such treatments are preferably carried out under conditions of temperature, concentration and quantity of mineral acid which do not lead to substantial degradation of the cellulose. A treatment with a lower fatty acid, for example acetic acid, may be applied in such a way as to introduce into the cellulose the catalyst required for the subsequent acetylation or other esterification. If desired, any mineral acid used during the pre-treatment may be neutralized or substantially neutralized before applying the esterifying agent. For further details as to the pre-treatments reference is made to French Patent No. 565,654 and U. S. Patents Nos. 1,831,101 and 1,911,069.

For the manufacture of good quality cellulose ethers and for the manufacture of viscose and other cellulose derivatives in which alkali is present during the conversion to the cellulose derivative, pre-treatments with mineral and/or organic acids are in general unnecessary and the cellulose may be subjected directly to the treatment for conversion into the desired cellulose derivative. Similarly in making nitrocellulose the nitrating acid may be applied directly to the purified cellulose prepared in accordance with the present invention.

Cellulose esters and ethers made from cellulose produced as above described may be employed in the manufacture of articles such as filaments and yarns of artificial silk and films, foils, moulded articles, etc., as also in compositions such as lacquer and other coating compositions and moulding powders.

The following examples illustrate, without in any way limiting, the invention:—

*Example 1*

Wood chips, either spruce or poplar, are treated with 5 times their weight of a 10% nitric acid solution at 60°–65° C. for about 5 hours. The materials are then drained and washed free from acid and boiled with a 2½% caustic soda solution for about 3 hours. A subsequent treatment with 15% caustic soda in the cold may advantageously be applied.

*Example 2*

Instead of the 10% acid in Example 1, a 7½% acid is employed at a temperature of 70°–75° C. for 5 to 7 hours. The products are subjected to an alkali treatment as described in Example 1.

*Example 3*

The wood chips are treated with 10 times their weight of a 5% nitric acid at a temperature between 90° and 95° C. for a period between 3 and 5 hours. The solid material is then freed from nitric acid and treated with alkali, as described in Example 1.

What I claim and desire to secure by Letters Patent is:—

1. Process for the manufacture of cellulose from wood, which comprises first treating the wood with an aqueous nitric acid of a concentration between 2 and 10% at a temperature below 95° C., and then subjecting the so-treated wood to a two stage treatment with an alkali, the first stage being a treatment with a hot weak alkali solution and the second stage being a treatment with a cold strong alkali solution.

2. Process for the manufacture of cellulose from wood, which comprises first treating the wood with an aqueous nitric acid of a concentration between 2 and 10% at a temperature below 95° C., and then subjecting the so-treated wood to a two stage treatment with an alkali, the first stage being a treatment with a hot 2½% caustic soda solution and the second stage being a treatment with a cold 15% caustic soda solution.

3. Process for the manufacture of cellulose from wood, which comprises first treating the wood with a 10% nitric acid solution at 60 to 65° C. for about 5 hours, and then subjecting the so-treated wood to a two stage treatment with an alkali, the first stage being a treatment with a hot 2½% caustic soda solution and the second stage being a treatment with a cold 15% caustic soda solution.

4. Process for the manufacture of cellulose from wood, which comprises first treating the wood with a 7½% nitric acid solution at 70 to 75° C. for 5 to 7 hours, and then subjecting the so-treated wood to a two stage treatment with an alkali, the first stage being a treatment with a hot 2½% caustic soda solution and the second stage being a treatment with a cold 15% caustic soda solution.

5. Process for the manufacture of cellulose from wood, which comprises first treating the wood with a 5% nitric acid solution at 90 to 95° C. for 3 to 5 hours, and then subjecting the so-treated wood to a two stage treatment with an alkali, the first stage being a treatment with a hot 2½% caustic soda solution and the second stage being a treatment with a cold 15% caustic soda solution.

HENRY DREYFUS.

DISCLAIMER 2,110,545.—*Henry Dreyfus*, London, England. TREATMENT OF CELLULOSIC MATERIALS. Patent dated March 8, 1938. Disclaimer filed November 5, 1941, by the assignee, *Celanese Corporation of America*.

Hereby enters this disclaimer to claim 1 of said patent.

[*Official Gazette December 2, 1941.*]